United States Patent
Seavey

(10) Patent No.: US 11,112,382 B2
(45) Date of Patent: Sep. 7, 2021

(54) ROBOTIC MAGNETIC FLUX INSPECTION SYSTEM FOR BRIDGE WIRE ROPE SUSPENDER CABLES

(71) Applicant: INFRASTRUCTURE PRESERVATION CORPORATION, Clearwater, FL (US)

(72) Inventor: William Seavey, Clearwater, FL (US)

(73) Assignee: INFRASTRUCTURE PRESERVATION CORPORATION, Clearwater, FL (US)

( * ) Notice: Subject to any disclaimer, the term of this patent is extended or adjusted under 35 U.S.C. 154(b) by 93 days.

(21) Appl. No.: 16/360,765

(22) Filed: Mar. 21, 2019

(65) Prior Publication Data

US 2019/0293604 A1     Sep. 26, 2019

Related U.S. Application Data

(60) Provisional application No. 62/646,136, filed on Mar. 21, 2018.

(51) Int. Cl.
- *G01N 27/9013* (2021.01)
- *G01N 27/90* (2021.01)

(52) U.S. Cl.
CPC ....... *G01N 27/902* (2013.01); *G01N 27/9006* (2013.01)

(58) Field of Classification Search
CPC ... G01N 27/83; G01N 27/902; G01N 27/9033
(Continued)

(56) References Cited

U.S. PATENT DOCUMENTS

| 3,656,054 A | * | 4/1972 | Forster | B82Y 15/00 |
|---|---|---|---|---|
| | | | | 324/213 |
| 4,543,528 A | * | 9/1985 | Baraona | G01N 27/904 |
| | | | | 324/262 |

(Continued)

FOREIGN PATENT DOCUMENTS

| JP | 2013-245496 | 12/2013 |
|---|---|---|
| KR | 10-2010-0047926 | 5/2010 |

(Continued)

OTHER PUBLICATIONS

Yun, H.B., Kim, S.H., Wu, L. and Lee, J.J., 2013. Development of inspection robots for bridge cables. The Scientific World Journal, 2013. (Year: 2013).*

(Continued)

*Primary Examiner* — Christopher P McAndrew
(74) *Attorney, Agent, or Firm* — Matthew G. McKinney, Esq.; Allen, Dyer et al.

(57) ABSTRACT

A robotic inspection system for bridge suspender cables includes a sensing device and a transport vehicle. The transport vehicle is configured to move the sensing device along a bridge suspender cable for taking main magnetic flux (MMF) readings as the sensing device moves along the bridge suspender cable. The system also includes a control station configured to wirelessly interface with the sensing device and the transport vehicle. In addition, the control station is configured to generate a bridge cable condition assessment report from the MMF readings to identify locations and sizes of deterioration of the bridge suspender cable.

20 Claims, 7 Drawing Sheets

(58) Field of Classification Search
 USPC .......................................................... 324/238
 See application file for complete search history.

(56) References Cited

U.S. PATENT DOCUMENTS

| | | | | |
|---|---|---|---|---|
| 4,546,316 | A * | 10/1985 | Lang | G01N 27/902 324/240 |
| 4,814,705 | A * | 3/1989 | Saunderson | G01N 27/82 324/225 |
| 5,051,696 | A * | 9/1991 | Schmale | G01N 27/902 324/262 |
| 5,451,872 | A * | 9/1995 | Antonine | G01N 27/902 324/262 |
| 5,914,596 | A * | 6/1999 | Weinbaum | G01N 29/225 324/228 |
| 7,496,454 | B2 | 2/2009 | Rogers et al. | |
| 8,513,943 | B2 * | 8/2013 | Gehlen | G05G 25/00 324/237 |
| 8,526,706 | B2 | 9/2013 | Verreet | |
| 8,614,707 | B2 | 12/2013 | Warsito et al. | |
| 8,660,698 | B2 | 2/2014 | Phillips et al. | |
| 9,068,440 | B1 * | 6/2015 | Lauf | G01N 27/72 |
| 9,075,023 | B2 | 7/2015 | Yoshioka et al. | |
| 9,371,960 | B2 | 6/2016 | Lorimer et al. | |
| 9,665,932 | B2 | 5/2017 | Lauffer et al. | |
| 2003/0169419 | A1 * | 9/2003 | Lewis | F22B 37/003 356/241.1 |
| 2005/0285588 | A1 * | 12/2005 | Katragadda | G01N 27/9026 324/126 |
| 2006/0236792 | A1 * | 10/2006 | Hanna | G01N 27/902 73/865.8 |
| 2007/0022830 | A1 * | 2/2007 | Mandziuk | G01N 27/902 73/865.8 |
| 2010/0181791 | A1 * | 7/2010 | O'Dell | F22B 37/006 294/93 |
| 2010/0259253 | A1 * | 10/2010 | Nishiyori | B66B 7/1215 324/240 |
| 2011/0006762 | A1 * | 1/2011 | Yoshioka | G01N 27/83 324/240 |
| 2013/0085365 | A1 | 4/2013 | Marashdeh et al. | |
| 2013/0127452 | A1 * | 5/2013 | Boenisch | G01N 27/9006 324/242 |
| 2014/0035569 | A1 * | 2/2014 | Yoshioka | G01N 27/82 324/242 |
| 2016/0161436 | A1 | 6/2016 | Marashdeh et al. | |
| 2017/0038338 | A1 * | 2/2017 | Kondoh | G01N 27/83 |
| 2017/0180612 | A1 * | 6/2017 | Marashdeh | H04N 5/23203 |
| 2018/0038833 | A1 * | 2/2018 | Iannucci | G01N 27/82 |
| 2018/0202972 | A1 * | 7/2018 | Omi | G01N 27/83 |

FOREIGN PATENT DOCUMENTS

| | | |
|---|---|---|
| KR | 10-2013-0032076 | 4/2013 |
| KR | 10-01480188 | 1/2015 |

OTHER PUBLICATIONS

Christen, R., Bergamini, A. and Motavalli, M., 2003. Three-dimensional localization of defects in stay cables using magnetic flux leakage methods. Journal of nondestructive evaluation, 22(3), pp. 93-101. (Year: 2003).*

Xu, F., Xia, D. and Jiang, G., Jul. 2013. Initial design and analysis of a helix cable detecting robot. In Proceedings of the 32nd Chinese Control Conference (pp. 5770-5774). IEEE. (Year: 2013).*

* cited by examiner

ROBOTIC MAGNETIC FLUX INSPECTION SYSTEM FOR BRIDGE WIRE ROPE SUSPENDER CABLES

RELATED APPLICATION

The present invention is related to U.S. Provisional Patent Application Ser. No. 62/646,136 filed Mar. 21, 2018, the entire contents of which are incorporated herein by reference.

TECHNICAL FIELD

The present invention relates to the field of bridge inspection devices, and, more particularly, to a robotic magnetic flux inspection system for bridge wire rope suspender cables and related methods.

BACKGROUND

The corrosion of bridge suspender cables is a serious problem that can compromise the structural integrity of a bridge with minimal visual signs. Consequently, the early detection of deficiencies of the bridge suspender cables is a major safety issue. Without detection, steel corrosion can occur to the point of failure without any major outward visual signs.

Methods of locating deficiencies of the bridge suspender cables is time consuming and labor intensive. Accordingly, there is a need to improve the inspection of bridge suspender cables that is more efficient and provides early detection of potential problems. It is, therefore, to the effective resolution of the aforementioned problems and shortcomings of the prior art that the present invention is directed.

However, in view of the prior art at the time the present invention was made, it was not obvious to those of ordinary skill in the pertinent art how the identified needs could be fulfilled.

SUMMARY

In a particular embodiment, a robotic magnetic flux inspection system for bridge wire rope suspender cables is disclosed. The system includes a sensing device configured to move along a bridge suspender cable to detect magnetic flux leakage, and a transport vehicle coupled to the sensing device and configured to move the sensing device up and down on the bridge suspender cable. In addition, the system includes a control station configured to wirelessly interface with the sensing device and the transport vehicle, where the control station is configured to generate a bridge suspender cable condition assessment report from the detection of the magnetic flux leakage to identify locations and sizes of the discontinuities within the bridge suspender cable.

The sensing device may have a sensor array and a plurality of sets of rare-earth magnets grouped in measurement channels, where each of which delivers a cross-sectional magnetic field. The sensing device may include a processor configured to analyze raw voltage measurements, and have an annulus shape.

The sensor array may have an inductive coil sensor configured to detect the magnetic flux leakage to indicate a discontinuity within the bridge suspender cable, or a Hall effect sensor configured to detect the magnetic flux leakage to indicate a discontinuity within the bridge suspender cable.

The magnets are configured to magnetize the bridge suspender cable along a longitudinal direction, and the sensor array is configured to detect the magnetic flux leakage perpendicular to a surface of the bridge suspender cable.

In addition, the system may include a control station configured to wirelessly interface with the sensing device and the transport vehicle. The control station is also configured to generate a bridge condition assessment report from the sensing device to identify locations of potential problem areas of the bridge suspender cables.

An advantage of the sensing device and the transport vehicle is that they can operate in windy and adverse weather conditions. The system also does not require lane closure to operate because there is no need for lifts, and poses virtually no risk to public safety or to the inspector.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

A robotic magnetic flux inspection system for bridge wire rope suspender cables (also referred to as "bridge suspender cables") disclosed herein is a comprehensive inspection system that utilizes a Magnetic Flux Leakage (MFL) non-destructive evaluation (NDE) system which is non-destructive testing (NDT) technology in order to locate and assess deterioration in bridge suspender cables.

In particular, cross-sectional damage can occur in steel bridge suspender cables due to corrosion and fracture, which can lead to stress concentrations. Cross-sectional damage can be a direct cause of structural failure. Therefore, non-destructive evaluation (NDE) is necessary to detect the initial stages of cross sectional damage in a cable. However, it is difficult to monitor the condition of most bridge suspender cables, as the damage can be invisible and inaccessibly located. Accordingly, the present invention utilizes a magnetic flux leakage (MFL) system to detect discontinuities.

The MFL system includes magnetizing the bridge suspender cables of the bridge. The bridge suspender cables that are magnetized have a magnetic field in and around them. The magnetic field spreads out when it encounters a small air gap created by a discontinuity and it appears to leak out of the bridge suspender cables. A strong permanent magnet or an electromagnet is used to establish a magnetic flux in the bridge suspender cables to be inspected. When there is no defect, the flux in the metal remains uniform. However, when there is a discontinuity the flux leaks out of the metal near the discontinuity. A sensor array is configured to detect this flux leakage and to generate an electric signal that is proportional to the magnetic flux leakage.

Referring now to FIGS. 1-5, the system includes a sensing device 100, which may be wireless and battery operated. In a particular embodiment, the sensing device 100 is coupled to a transport vehicle 200 shown in FIG. 2 that is configured to move the sensing device 100 up and down bridge suspender cables 110 performing an MRI like inspection. The inspections are real-time with minimum back office processing.

In a particular illustrative embodiment, the sensing device 100 implements Magnetic Flux Leakage (MFL) methodology described above to generate the data. MFL allows an inspector to efficiently perform the MRI like inspection of the bridge suspender cables 110.

Figure 12:
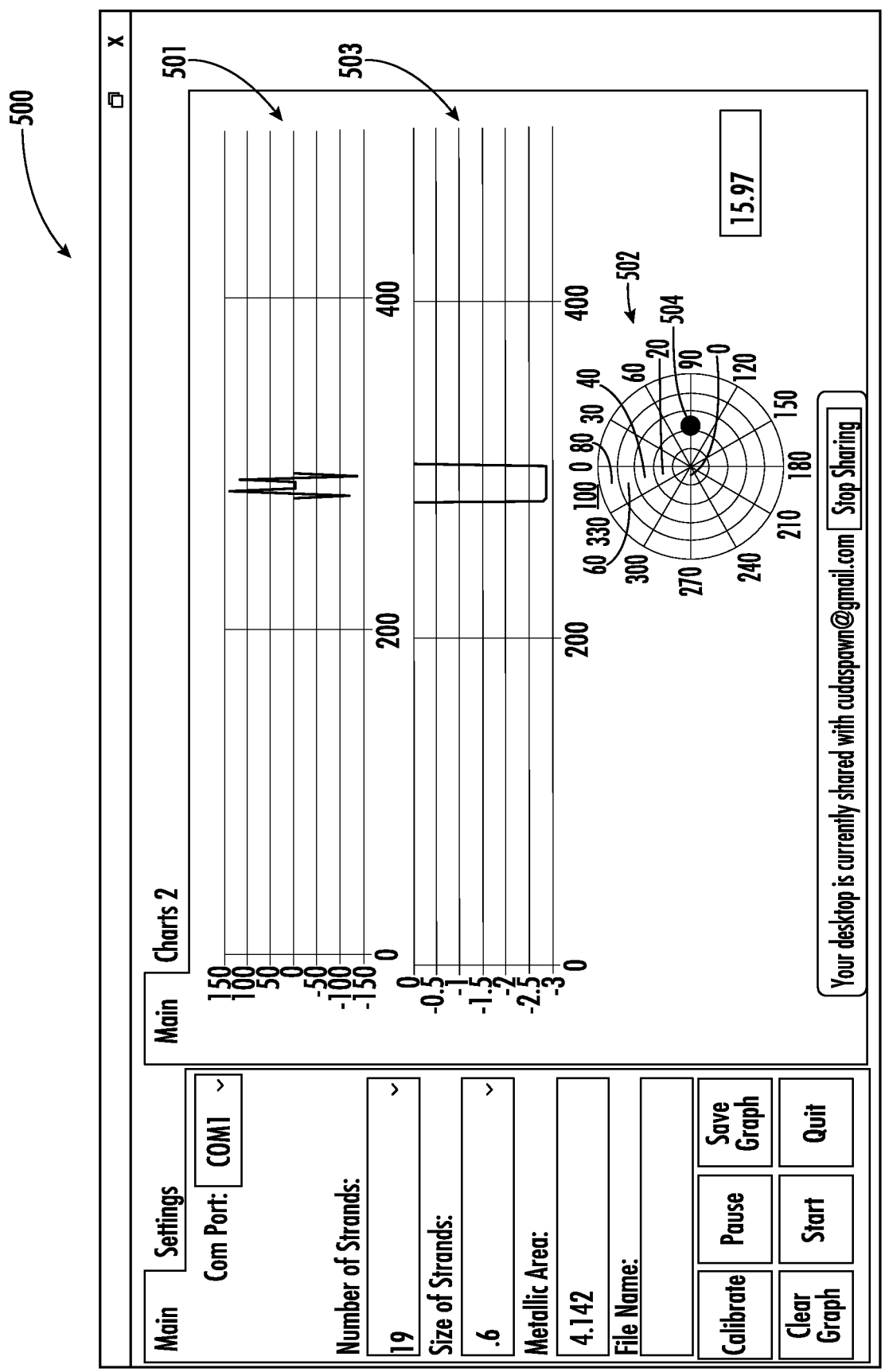
FIG. 12 is an exemplary graph generated using data from the sensing device.

In a particular illustrative embodiment, the sensing device 100 uses the magnetic flux leakage (MFL) method described above to generate a visual indicator of the condition of the bridge suspender cables 110. For example, the visual indicator may be a two dimensional graph (as shown in FIG. 12 discussed below) that indicates where the discontinuity within the bridge suspender cable 110 is located and to what degree. The sensing device 100 takes multiple measurements of the magnetic field of the bridge suspender cable 110 and combines these measurements to provide information of the magnetic properties of the process volume to indicate the extent of loss of magnetic area. This correlates to the amount and location of steel within the bridge suspender cable 110 that may be damaged.

The sensing device 100 includes a first magnet 102 having a first polarity and a second magnet 104 having a second polarity. The first and second magnets 102, 104 may comprise sets of rare-earth magnets grouped in measurement channels, where each of which delivers a cross-sectional magnetic field. The sensing device 100 also includes a sensor array 106 that may be coupled to a processor (e.g. of a control station 304 discussed below) that is configured to analyze raw voltage measurements from the sensor array 106 using algorithms and provide analysis and export of graphical data. The sensor array 106 is configured to detect the magnetic flux leakage perpendicular to a surface of the suspender cables 110. The sensor array 106 comprises an inductive coil sensor or Hall effect sensor configured to detect the magnetic flux leakage to indicate a discontinuity within the bridge suspender cables 110.

Figure 1:
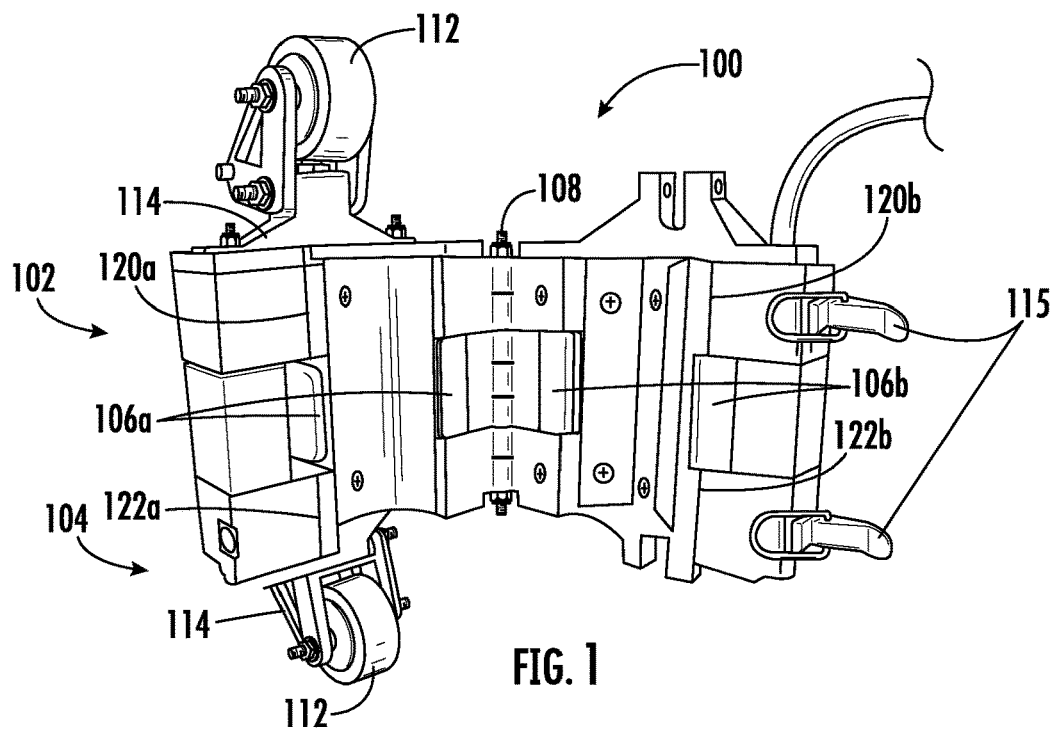
FIG. 1 is a front perspective view of a sensing device in an open position in accordance with an embodiment of the present invention.
Figure 2:
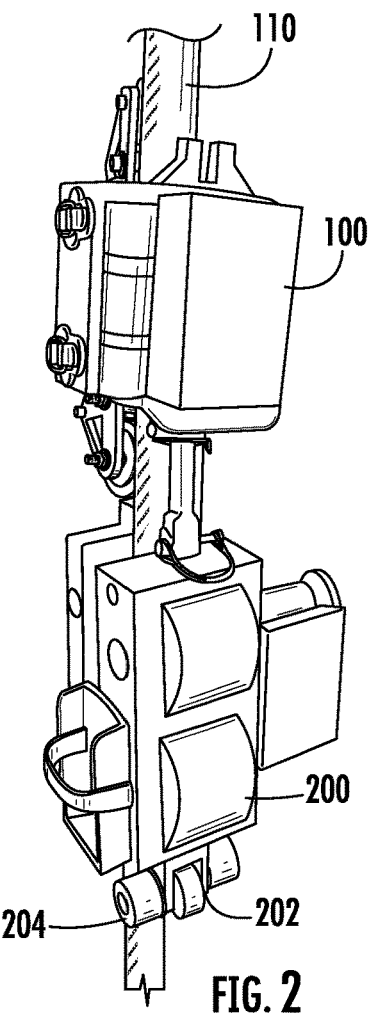
FIG. 2 is a front perspective view of the sensing device and a transport vehicle secured around a bridge suspender cable.
Figure 4:
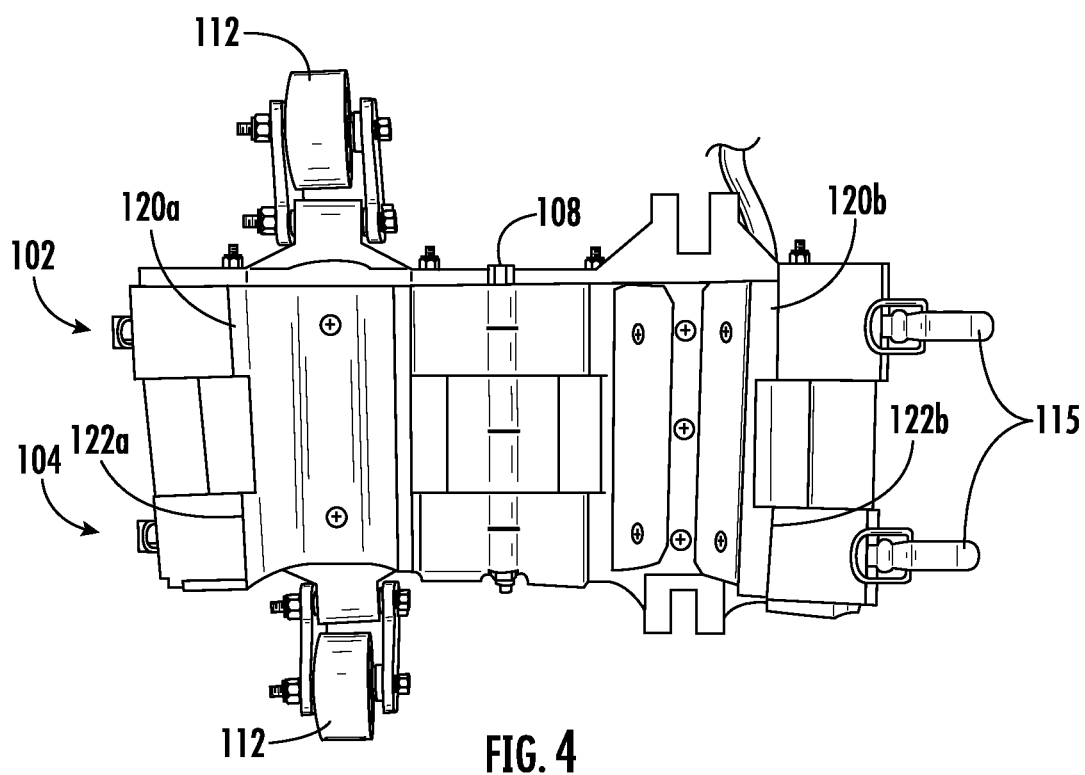
FIG. 4 is a front view of an interior of the sensing device in an open position.

As shown in FIGS. 1 and 4, the first magnet 102 comprises two halves 120a, 120b, that are hingedly coupled to each other by a hinge 108 and secured together using claps 115. Similarly, the second magnet 104 comprises two halves 122a, 122b that are hingedly coupled to each other. Accordingly, the first and second magnets 102, 104 can be swung apart so that the sensing device 100 can be secured completely around the bridge suspender cable 110.

Figure 3:
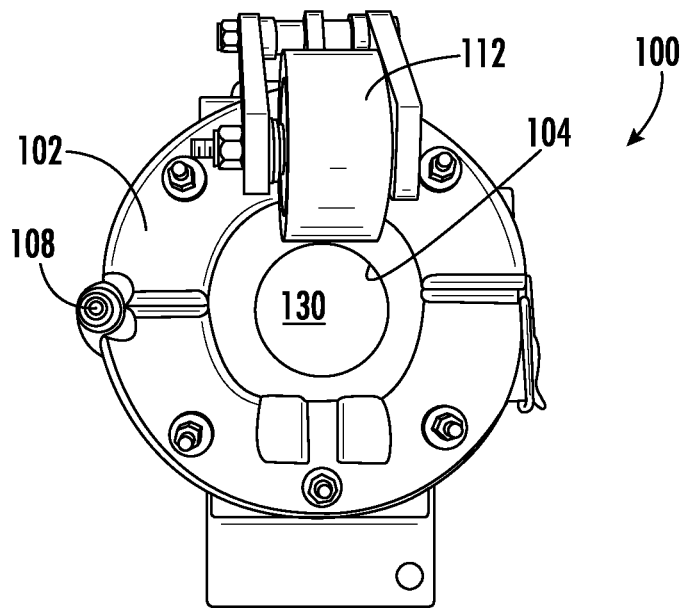
FIG. 3 is a top view of the sensing device in a closed position.

Once the sensing device 100 is secured to the bridge suspender cable 110 creating a center aperture 130 as shown in FIG. 3, the wheels 112 can be adjusted using respective wheel clamps 114 so that the first and second magnets 102, 104 can be rolled along the bridge suspender cable 110 passing adjacent within a few inches of the exterior surface of the bridge suspender cable 110.

Figure 5:
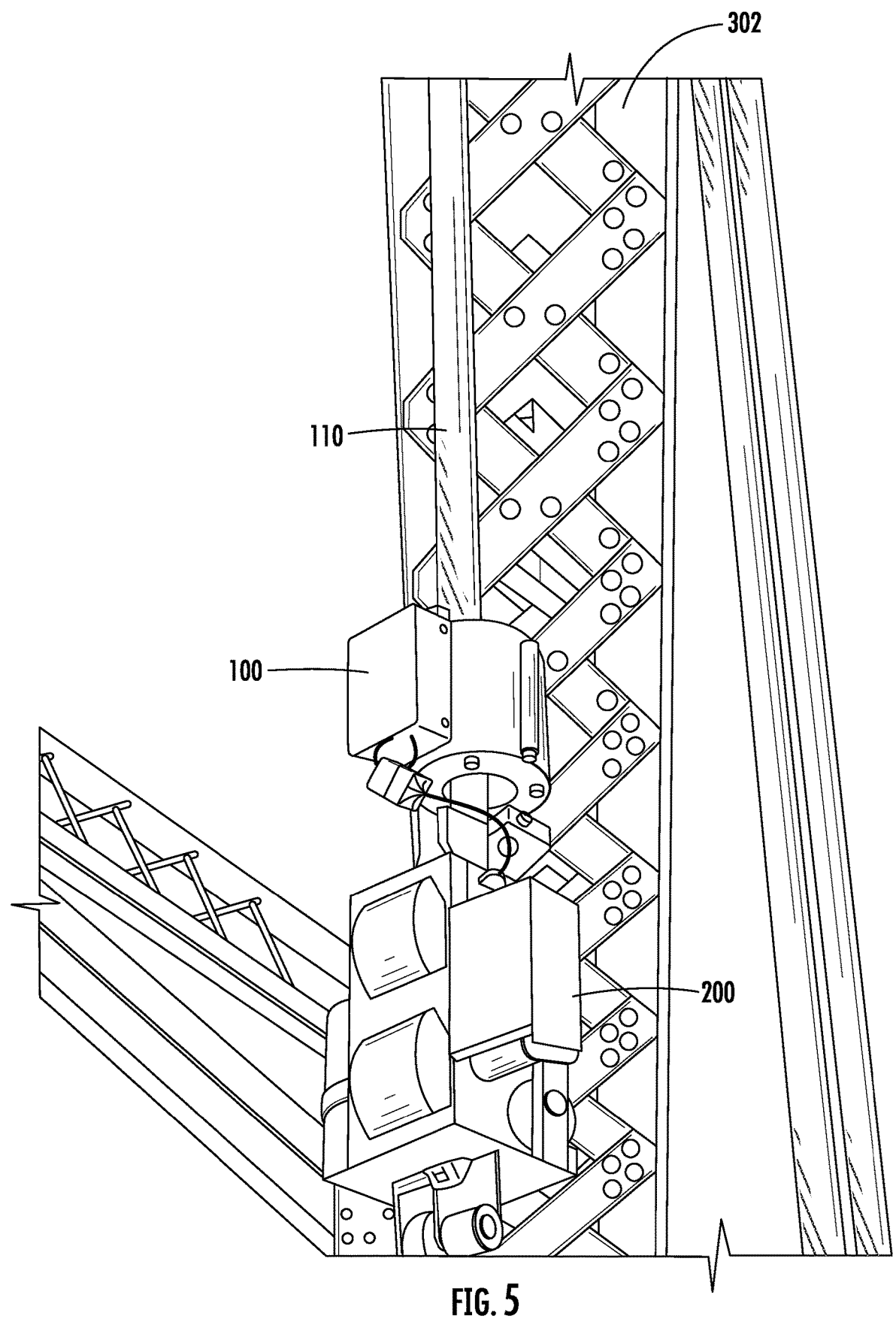
FIG. 5 is a schematic of the sensing device and the transport vehicle coupled to the bridge suspender cable.

Referring now to FIGS. 5-11, the transport vehicle 200 and sensing device 100 are latched around the bridge suspender cable 110 of the bridge structure 302. FIG. 5 is a detail view of the transport vehicle 200 and the sensing device 100. Adjustment bolts may be used to secure the attachment of the transport vehicle 200 to the bridge suspender cables 110. The transport vehicle 200 and sensing device 100 are then powered up. The transport vehicle 200 and sensing device 100 are configured to perform a short diagnostic to insure that the communications are working and that the mechanical robotics are functional and remote controllable and to make sure the sensing device 100 is operable and transmitting the main magnetic flux (MMF) data to the control station 304.

The transport vehicle 200 is checked for maneuverability up and down the bridge suspender cables 110. Once all functionalities are confirmed, then the recording is checked for performance and quality. In addition, the power system is checked for appropriate amps and voltage. The transport vehicle 200 and sensing device 100 are then ready to be deployed up the bridge suspender cable 110 towards its upper end. The transport vehicle 200 has sufficient gripping power to maintain a solid and consistent connection with the bridge suspender cable 110 as it travels up and down the bridge suspender cable 110.

The inspector 300 stands at the control station 304 that may include a joystick 306 to control movement of the transport vehicle 200. The sensing device 100 uses wireless connectivity to transmit the MRI like data to the control station 304 where the inspector 300 performs real-time assessments of the bridge cables 110.

Figure 7:
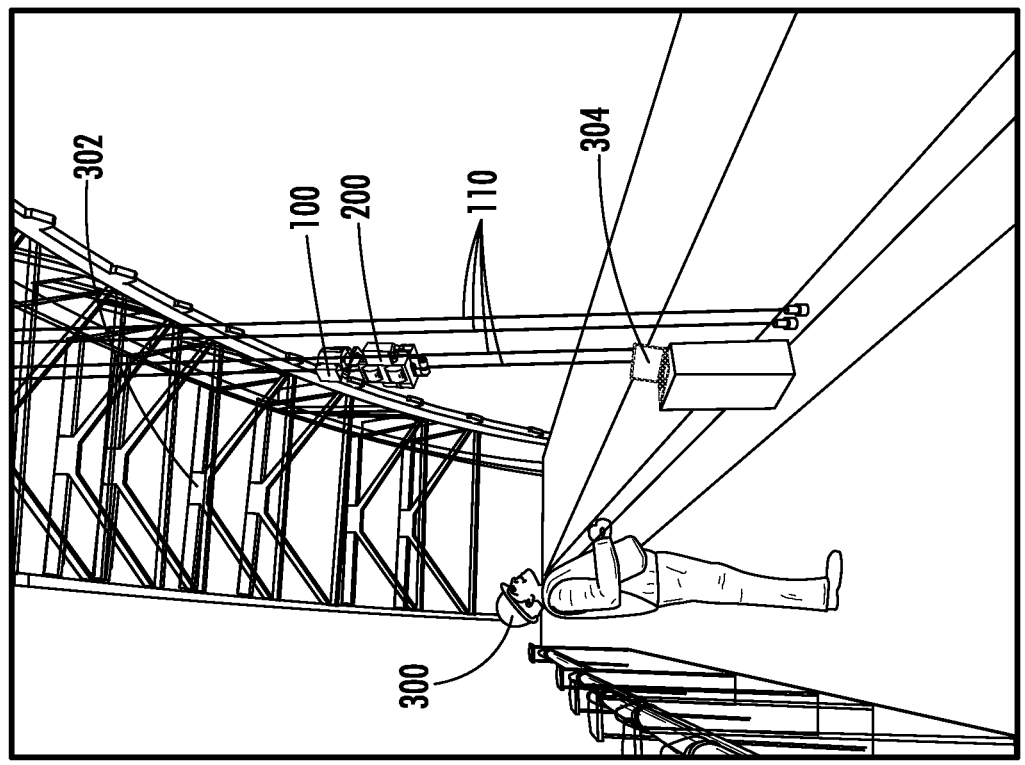
FIG. 7 is a schematic of the operator directing the transport vehicle down the bridge suspender cable.
Figure 6:
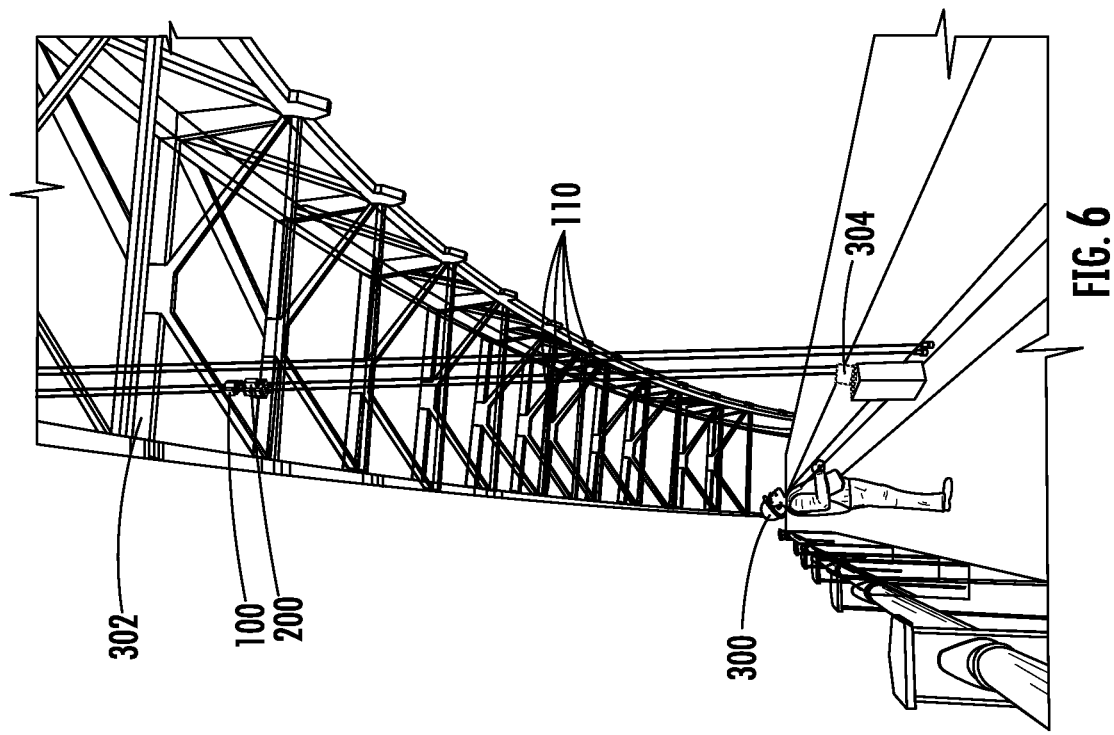
FIG. 6 is a schematic of an operator directing the transport vehicle and sensing device up the bridge suspender cable.

FIG. 6 is a schematic of the inspector 300 directing the transport vehicle 200 and sensing device 100 up the bridge suspender cables 110. In particular, the transport vehicle 200 is a comprehensive maneuverable inspection device that can travel up and down the bridge suspender cables 110. FIG. 7 is a schematic of the inspector 300 directing the transport vehicle 200 and sensing device 100 back down the bridge suspender cables 110. The transport vehicle 200 includes wireless communications equipment in order to receive command and control commands and also to wirelessly transmit main magnetic flux (MMF) data.

Figure 9:
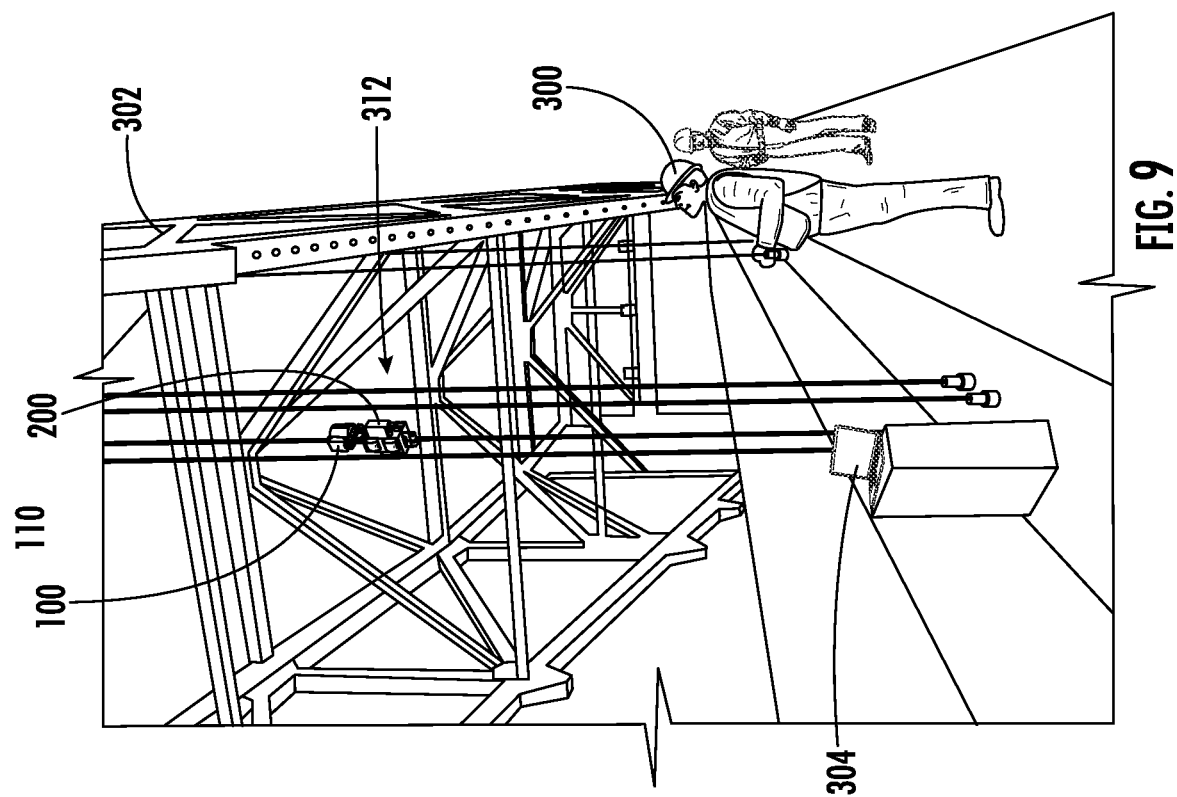
FIG. 9 is a schematic of the operator directing the transport vehicle and sensing device down the bridge suspender cable.
Figure 8:
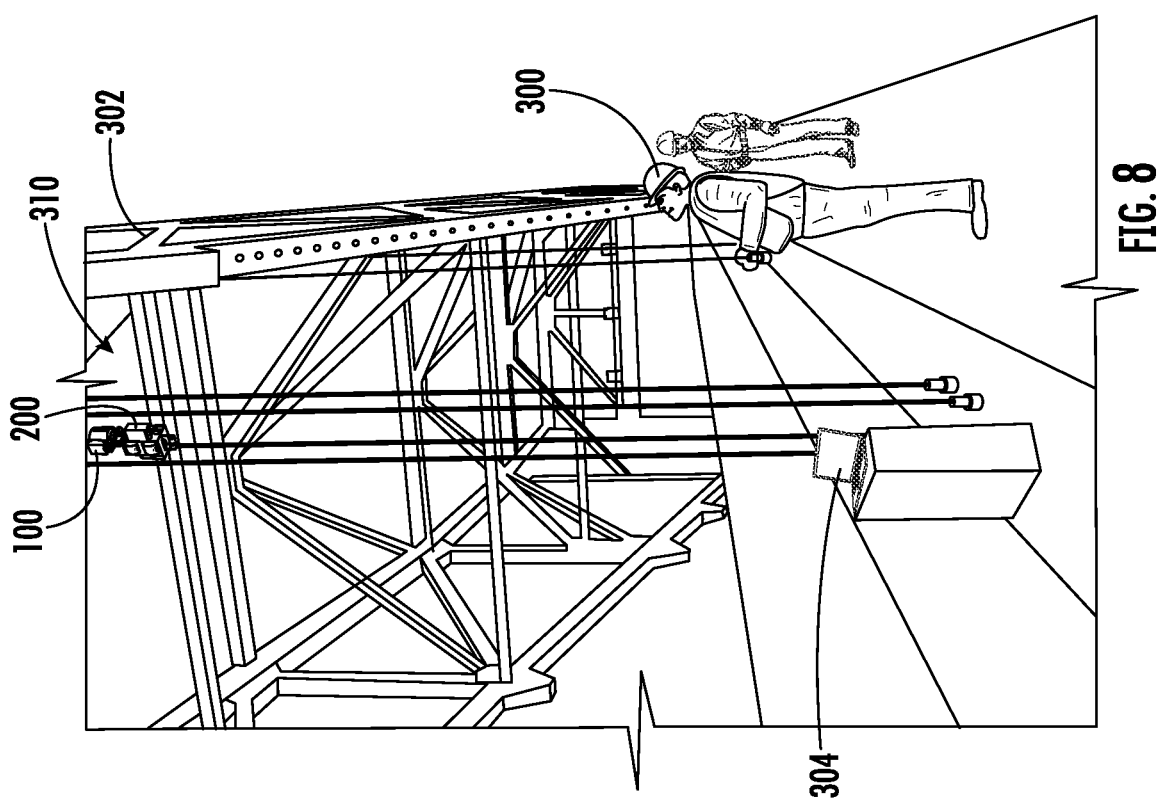
FIG. 8 is a schematic of the operator directing the transport vehicle and sensing device up the bridge suspender cable.

The transport vehicle 200 is configured to mount to selected bridge suspender cable 110 and travel the length of the bridge suspender cable 110 while being fully controlled and monitored remotely as shown in FIGS. 8 and 9. As explained above, the transport vehicle 200 and sensing device 100 are configured to be secured around the bridge suspender cable 110 using the clasps 115 that allows them to swing open and closed in order to be secured around the bridge suspender cable 110.

Figure 10:
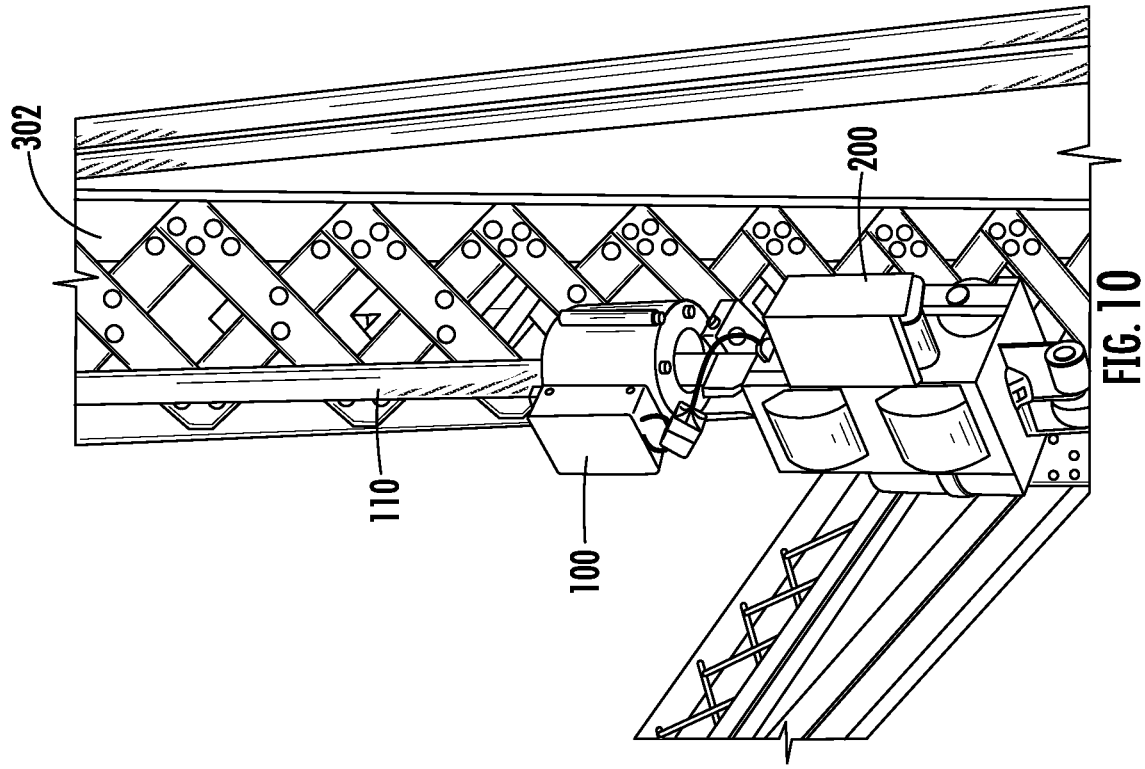
FIG. 10 is a perspective view of transport vehicle and sensing device secured around the bridge suspender cable.

The wheels 202 for the transport vehicle 100 and the wheels 112 for the sensing device 100 may comprise rubber adapted for griping the bridge suspender cable 110 and for mobility. The transport vehicle 200 is able to transverse the bridge suspender cable 110 up and down from the lower portion to the upper portion by the rotation of the wheels 112, 202 as shown in FIG. 10. Electric motors 204 drive the wheels 202 for the transport vehicle 200. The transport vehicle 200 is configured to gradually accelerate and decelerate in order to not spin the wheels 202. The electric motor 204 is responsive to remote controls 306 operated by the inspector 300.

The transport vehicle 200 may also include spring loaded wheels that are biased to maintain contact with the bridge suspender cable 110. The spring forces the wheels of the transport vehicle to make secure contact to the bridge suspender cable 110.

Figure 11:
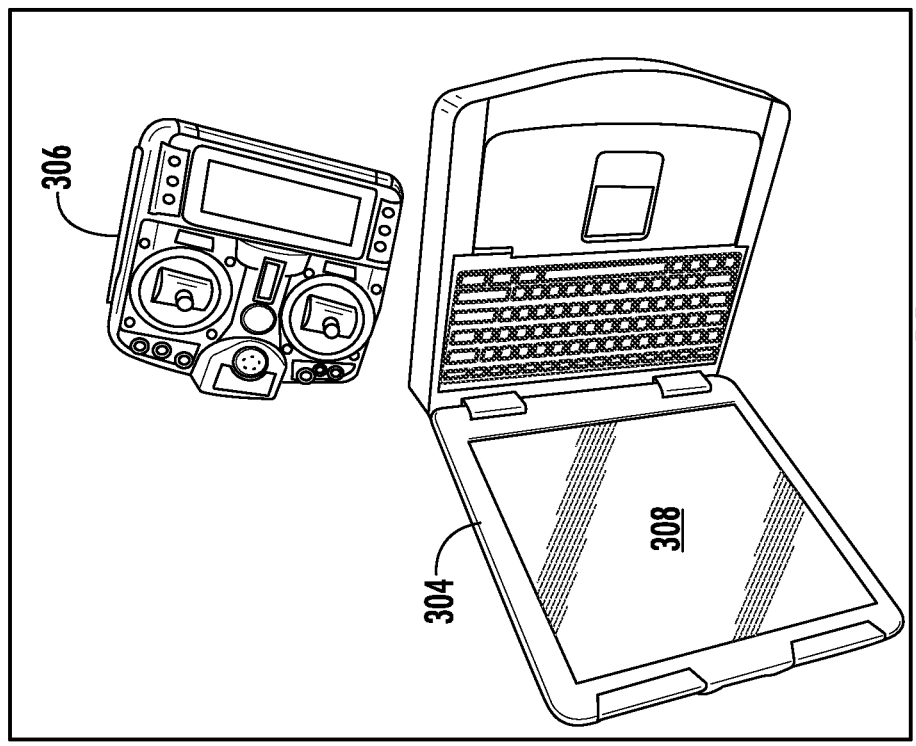
FIG. 11 is a schematic of a control station and joystick configured to wirelessly communicate with the transport vehicle and the sensing device.

Referring now to FIG. 11, the control station 304 and joystick 306 are shown that are used in cooperation with the transport vehicle 200 and the sensing device 100. In a particular embodiment, the joystick 306 is used to transmit wireless signals to the transport vehicle 200. For example, wireless signals may be transmitted to the wheels 202 to drive forward or in reverse, which corresponds to moving up or down the bridge suspender cable 110. The control station 304 may include a video monitor 308 that is used for displaying data received from the sensing device 200.

Referring now to FIG. 12, results of a non-destructive evaluation of bridge suspender cables 110 can be generated in a graph 500 to make it easy to interpret by the inspector. The results are included as part of a condition assessment report that is generated using the inspection results from the sensing device 100 and identifies locations and sizes of these discontinuities. By accurately detecting deficient areas within the bridge suspender cables 110, repairs can be made more quickly and can be more efficiently conducted.

For example, the results of measurements from the sensing device 100 (e.g. raw voltage measurements) are plotted along a measurement line 501 and where magnetic flux leakage is detected is shown in portion 503 of the graph 500. A correlating chart 502 reflects loss of magnetic area (LMA) values 504. As can be seen in FIG. 11, portion 502 of the graph 500 indicates a relative loss of magnetic area and area within the bridge suspender cable 110 that should be flagged for further inspection and/or repair.

The present inspection system is designed to overcome the shortcomings of the current techniques and methodologies in the art and assist in the preservation of service life of existing bridges. In particular, the system is configured to pinpoint discontinuities within bridge suspender cables 110, which may indicate need for a repair and helps to manage maintenance over time.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A robotic inspection system to detect discontinuities within bridge suspender cables, the system comprising:
    a sensing device having a top end and an opposing bottom end, the sensing device configured to encircle and move along a bridge suspender cable to detect magnetic flux leakage;
    a removeable connector bar having a first end and an opposing second end;
    a transport vehicle having a top end and an opposing bottom end, the transport vehicle linearly spaced apart from the bottom end of the sensing device, the first end of the removeable connector bar coupled to the bottom end of the sensing device, and the second end of the removeable connector bar coupled to the top end of the transport vehicle, the transport vehicle is configured to move the sensing device up and down on the bridge suspender cable via the removeable connector; and
    a control station configured to wirelessly interface with the sensing device and the transport vehicle, the control station configured to generate a bridge suspender cable condition assessment report from the detection of the magnetic flux leakage to identify locations and sizes of the discontinuities within the bridge suspender cable.

2. The robotic inspection system of claim 1, wherein the sensing device comprises a sensor array.

3. The robotic inspection system of claim 2, wherein the sensing device comprises a plurality of sets of rare-earth magnets grouped in measurement channels, wherein each of which delivers a cross-sectional magnetic field.

4. The robotic inspection system of claim 3, wherein the sensing device comprises a processor configured to analyze raw voltage measurements.

5. The robotic inspection system of claim 2, wherein the sensing device comprises an annulus shape.

6. The robotic inspection system of claim 2, wherein the sensor array comprises an inductive coil sensor configured to detect the magnetic flux leakage to indicate a discontinuity within the bridge suspender cable.

7. The robotic inspection system of claim 2, wherein the sensor array comprises a Hall effect sensor configured to detect the magnetic flux leakage to indicate a discontinuity within the bridge suspender cable.

8. The robotic inspection system of claim 3, wherein the magnets are configured to magnetize the bridge suspender cable along a longitudinal direction.

9. The robotic inspection device of claim 2, wherein the sensor array is configured to detect the magnetic flux leakage perpendicular to a surface of the bridge suspender cable.

10. The robotic inspection system of claim 2, wherein the sensing device comprises an annulus shape configured to open to be secured completely around a bridge suspender cable.

11. A robotic inspection system to detect discontinuities within bridge suspender cables, the system comprising:
    a sensing device having a top end and an opposing bottom end, the sensing device configured to move along a bridge suspender cable to detect magnetic flux leakage;
    a removeable connector bar having a first end coupled to the bottom end of the sensing device and an opposing second end configured to be coupled to a transport vehicle;
    a sensor array coupled to the sensing device; and
    a plurality of magnets coupled to the sensing device to magnetize the bridge tendon.

12. The robotic inspection system of claim 11, wherein the sensing device comprises a processor coupled to the sensor array and configured to analyze raw voltage measurements.

13. The robotic inspection system of claim 11, wherein the sensing device comprises an annulus shape.

14. The robotic inspection system of claim 11, wherein the sensor array comprises an inductive coil sensor configured to detect the magnetic flux leakage to indicate a discontinuity within the bridge suspender cable.

15. The robotic inspection system of claim 11, wherein the sensor array comprises a Hall effect sensor configured to detect the magnetic flux leakage to indicate a discontinuity within the bridge suspender cable.

16. The robotic inspection system of claim 11, wherein the magnets are configured to magnetize the bridge suspender cable along a longitudinal direction.

17. The robotic inspection device of claim 11, wherein the sensor array is configured to detect the magnetic flux leakage perpendicular to a surface of the bridge suspender cable.

18. The robotic inspection system of claim 11, wherein the sensing device comprises an annulus shape configured to open to be secured completely around the bridge suspender cable.

19. A sensing device to detect discontinuities within bridge suspender cables and configured to be coupled to a transport vehicle, the sensing device comprising:
- a sensor array to detect magnetic flux leakage within a bridge suspender cable; and
- a plurality of magnets configured to magnetize the bridge suspender cable;
- a removeable connector bar having a first end and an opposing second end;
- wherein the sensing device having an annulus shape that fits around the bridge suspender cable, and having a top end and an opposing bottom end, wherein the first end of the removeable connector bar is coupled to the bottom end of the sensing device, and the second end of the removeable connector bar is configured to be coupled to a top end of the transport vehicle.

20. The sensing device of claim 19, wherein the sensor array comprises an inductive coil sensor or Hall effect sensor configured to detect the magnetic flux leakage to indicate a discontinuity within the bridge suspender cable.

* * * * *